Aug. 1, 1961 A. L. HOPPER 2,994,829

DELAY SYSTEM

Filed Nov. 1, 1950 3 Sheets-Sheet 1

INVENTOR
A. L. HOPPER

BY Hugh S. Wertz
ATTORNEY

Aug. 1, 1961 A. L. HOPPER 2,994,829

DELAY SYSTEM

Filed Nov. 1, 1950 3 Sheets-Sheet 2

INVENTOR
A. L. HOPPER

BY Hugh S. Wertz
ATTORNEY

INVENTOR
A. L. HOPPER
BY Hugh S. Wertz
ATTORNEY

United States Patent Office 2,994,829

Patented Aug. 1, 1961

2,994,829
DELAY SYSTEM

Andrew L. Hopper, Summit, N.J., assignor to Bell Telephone Laboratories, Incorporated, New York, N.Y., a corporation of New York Filed Nov. 1, 1950, Ser. No. 193,399
4 Claims. (Cl. 328—177)

This invention relates to delay systems and, more particularly, to systems of the type utilizing an electromechanical delay line having an acoustic transmitting medium as the delay element.

Electrochemical delay lines have been used hitherto for obtaining delays in electrical systems. Such lines comprise essentially two piezoelectric crystal transducers associated with a solid acoustic transmitting medium such as fused silica or glass. The electrical signals to be delayed are impressed upon the input crystal for conversion into mechanical vibrations in the nature of acoustic waves. These are, in turn, imparted to the solid transmitting medium. The required delay occurs during the traverse therethrough to the output crystal which reconverts the vibratory waves into electrical signals. Such devices represent a practical means for obtaining broad-band delays up to hundreds of microseconds.

Delay lines of this kind have wide applicability in electronic systems, for example, in television and "memory" systems. In particular, such delay lines can be used to aid in the study of the correlation of informationt in television transmission. In such study, it is important to compare continuously signal elements with preceding signal elements, and delay lines are useful for this application. However, for such and similar applications, it is necessary to provide amplification to compensate for the very considerable attenuation experienced by the electrical signals during the delay process. Moreover, such delay lines are ordinarily characterized by a non-uniform frequency response which can limit their applicability to broad-band systems.

It is important, therefore, for realization of the maximum potentialities of such delay lines, to provide associated circuitry suitable for amplification and equalization of the delayed output. However, hitherto, such circuitry has been characterized by a high noise level and has not provided the necessary amplification and equalization desired.

Accordingly, it is an object of this invention to improve such circuitry for providing a broad-band delay system.

Related objects are to compensate for the attenuation and to equalize the frequency response introduced by the delay line in delay systems of this kind.

In particular, a specific object of this invention is to provide a delay system of this kind for obtaining for video signals a delay of one television line (approximately 63.5 microseconds).

These and related objects are achieved in accordance with the invention by providing a delay system in which the input signal to be delayed is modulated by a signal of carrier frequency to derive a modulated signal which is supplied to an electromechanical delay line, the derived signal being applied to this delay line at one end by means of a crystal transducer and recovered at the other end by means of a similar crystal transducer after a delay of the interval consumed in traversing the delay line. The delayed signal is then applied to an equalizing amplifier, the output signal being derived by detection of the equalized output of the amplifier. In a specific exemplary embodiment, the input signal comprises a television signal and the delay line provides a delay interval equal to the time of one television line (approximately 63.5 microseconds).

The invention will be better understood by reference to the following more detailed description taken in conjunction with the accompanying drawings forming a part thereof, in which.

Figure 1:
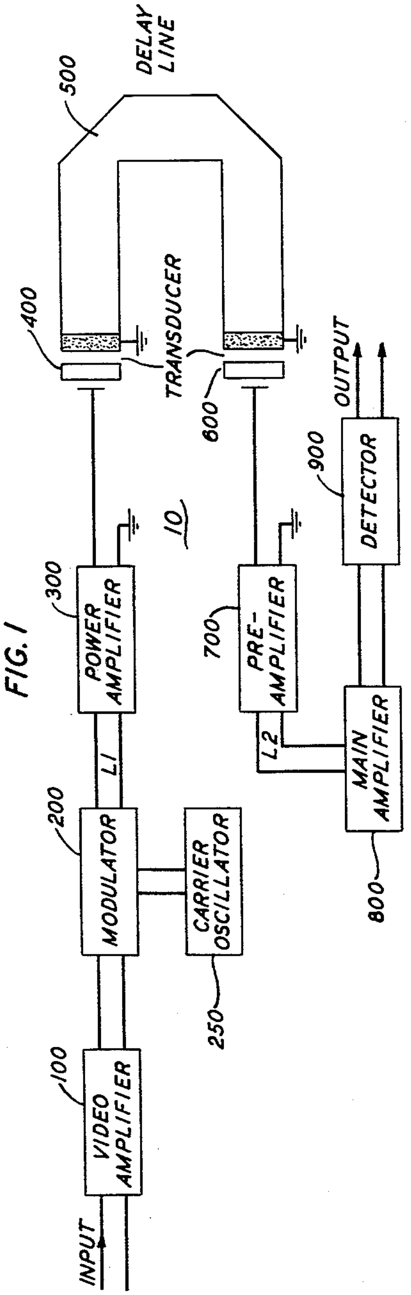
FIG. 1 shows in block schematic form an exemplary delay system in accordance with the invention for use with video input signals.

With reference more particularly to the drawings, FIG. 1 shows as an exemplary embodiment of the invention a delay system 10 adapted for video signals. The input video signals are supplied first to a video amplifier 100, which can be of conventional design, for amplifying the input signals to the desired level. Thereafter, the video output is supplied to a modulator 200 which is further supplied with a signal of carrier frequency from the oscillator 250. The carrier frequency is selected to insure operation of the electrochemical delay element in a suitable range of frequencies. It will be convenient to describe the invention hereinafter with reference to an embodiment designed for delaying video signals one line time (approximately 63.5 microseconds), although it is to be understood that it is not intended thereby to limit the scope of the invention thereto. For this case, a carrier frequency of 54 megacycles has been found satisfactory, and amplitude modulation transmission has been chosen for simplicity in preference to frequency modulation which is also feasible. The base-band video signal is used to modulate the 54-megacycle carrier, and the carrier and sidebands are recovered for transmission through the delay element. However, before being supplied to the delay element, it is preferable to introduce some power amplification of this modulated carrier. A broad-band power amplifier 300 (shown in greater detail in FIG. 2) is utilized to produce the desired amplification. The amplified output is applied to the input electrochemical transducer 400 for conversion into mechanical vibrations which are imparted to the input end of the solid transmitting medium which forms the delay element 500. The delay element 500 used in this particular application is a U-shaped fused silica bar utilizing shear or transverse wave transmission. The electrical signal applied to the crystal 400 causes it to vibrate mechanically, setting up transverse waves which travel along the solid transmitting medium until they strike the crystal 600 which is thereby set into mechanical vibration and the stresses thus caused in the crystal produce the delayed electrical signal. For a more complete discussion of such delay elements, reference is made to the copending application of H. J. McSkimin, Serial No. 125,049, filed November 2, 1949, now United States Patent No. 2,727,214, issued December 13, 1955.

At the output end of the delay element 500, the mechanical vibrations which have traversed it are impressed on the output transducer 600 for the reciprocal conversion to an attenuated facsimile of the electrical impulses applied to the input. Quartz crystals with a fundamental resonance frequency of 18 megacycles per second are found suitable for use as the input and output transducers. The choice of a carrier frequency which is a harmonic of that of the characteristic frequency of the crystals permits simplifications in filtering. The recovered signal, which has been delayed by the time required for traverse of the delay element, is applied to a preamplifier 700. In the delay process there results both considerable attenuation from dissipation losses and distortion from the non-uniform frequency response of the delay assembly. Amplification and equalization are therefore necessary in the subsequent stages to secure the high quality performance desired. A preferred form of the preamplifier 700 is shown diagrammatically in FIG. 2. Thereafter, the output therefrom is further amplified by the main amplifier 800 (shown in greater detail in FIG. 3), which includes a "soaker" circuit to broaden and flatten the transmission response, consisting of a low Q (ratio of reactance to resistance) shunt resonant circuit in parallel with a higher Q series resonant circuit. The series resonant circuit absorbs energy in the center of the pass band, and for that reason this arrangement is designated, for purposes of reference, a "soaker" circuit. The output of the main amplifier is supplied to the detector 900 (shown in FIG. 3) for demodulation and recovery of the original video signals.

Figure 2:
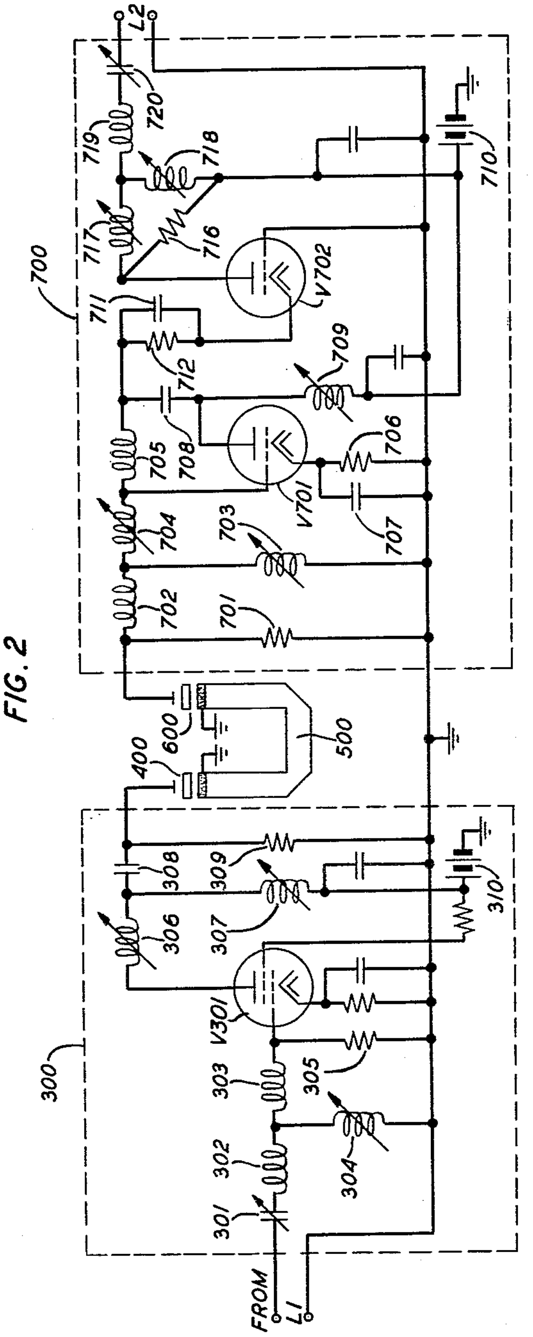
FIGS. 2 and 3 show, diagrammatically, circuits for use in the system of FIG. 1.

FIG. 2 illustrates diagrammatically a portion of the delay system shown schematically in FIG. 1. The modulated carrier output provided by the modulator 200 (shown in FIG. 1) is supplied to the power amplifier 300 by means of the line L1. This output is applied to the grid of the power amplifier stage V301 by way of the double-tuned coupling arrangement comprising the capacitance 301, the inductances 302, 303 and 304, the resistance 305 and the stray capacitances (not shown). This coupling arrangement is used to improve the impedance match between the line L1 and the input circuit of the stage V301. In general, in this embodiment which is operating in the frequency region of 54 megacycles, the band-pass interstage coupling networks can be tuned by the stray or parasitic capacitances associated with the input and output circuits.

The tube V301 is operated as an amplifier, deriving its plate and screen voltages from the voltage supply 310. The plate load comprises the double-tuned arrangement including the inductances 306 and 307, the stray capacitances, and the resistance 309. To provide maximum voltage across resistance 309, this arrangement is mismatched by loading at the output end only with the resistance 309. The amplifier output is applied through the coupling capacitance 308 to the input transducer 400 for transmission through a fused silica delay element 500 and is recovered by the output transducer 600 after the delay. The delay element is designed to provide a delay interval of one television line time (approximately 63.5 microseconds). The transducers comprise piezoelectric quartz crystals which are solder bonded to the fused silica bar. The crystals are energized electrically by electrodes held thereagainst by light spring pressure.

As a circuit element, the fused silica delay line with its quartz crystal transducers can be likened to a pentode having high input and output resistances, together with input and output capacitances of the order of 30 micromicrofarads. To attain the desired band width at a carrier frequency of 54 megacycles, it is necessary to provide resistive loading at each end in addition to that provided by the plate resistance of the driving amplifier tube V301 and the input resistance of the following preamplifier stage V701, respectively. It is found that double-tuned circuits with single side loading with the added loading concentrated at the delay line terminals provide a high gain band width product. The arrangement of the inductances 306 and 307, the stray capacitances, and the loading resistance 309, and the arrangement of resistance 701, the stray capacitances, and inductances 702, 703 and 704, provide the necessary loading therefor at the input and output terminals, respectively.

The tubes V701 and V702 of the preamplifier 700 operate as a "cascode" amplifier of the kind described in a publication entitled "Low Noise Amplifier" by Wallman, MacNee, and Gadsden, published in the Proceedings of the Institute of Radio Engineers, June 1948. Such a designation is applied to a two-stage amplifier whereof the first stage uses a grounded cathode and the second stage a grounded control grid. The first tube V701 has its cathode grounded through the self-biasing arrangement of resistance 706 and capitance 707 and the plate voltage therefore is derived from the voltage supply 710 through the inductance coil 709. Neutralization of the grid-plate capacitance is achieved by means of the inductance 705 which is adjusted to resonate with the grid-plate capacitance of tube V701 at the center frequency of the pass band. The output of the first stage V701 is coupled to the cathode of the grounded grid stage V702 through the coupling capacitance 708 and the self-biasing cathode arrangement made up of resistance 712 and capacitance 711. The plate voltage for this stage is also supplied from the voltage supply 710. The plate load comprises the arrangement of resistance 716, the inductances 717, 718 and 719, the stray capacitances, and capacitance 720, which simulates a double-tuned transformer coupling the plate circuit of tube V702 to the impedance of the line L2 leading to the main amplifier 800 (FIG. 1) of the system. A cascode preamplifier of this kind is very stable, easy to neutralize, and has an excellent noise figure, probably resulting from the high input impedance which makes possible a great impedance mismatch at the input.

Figure 3:
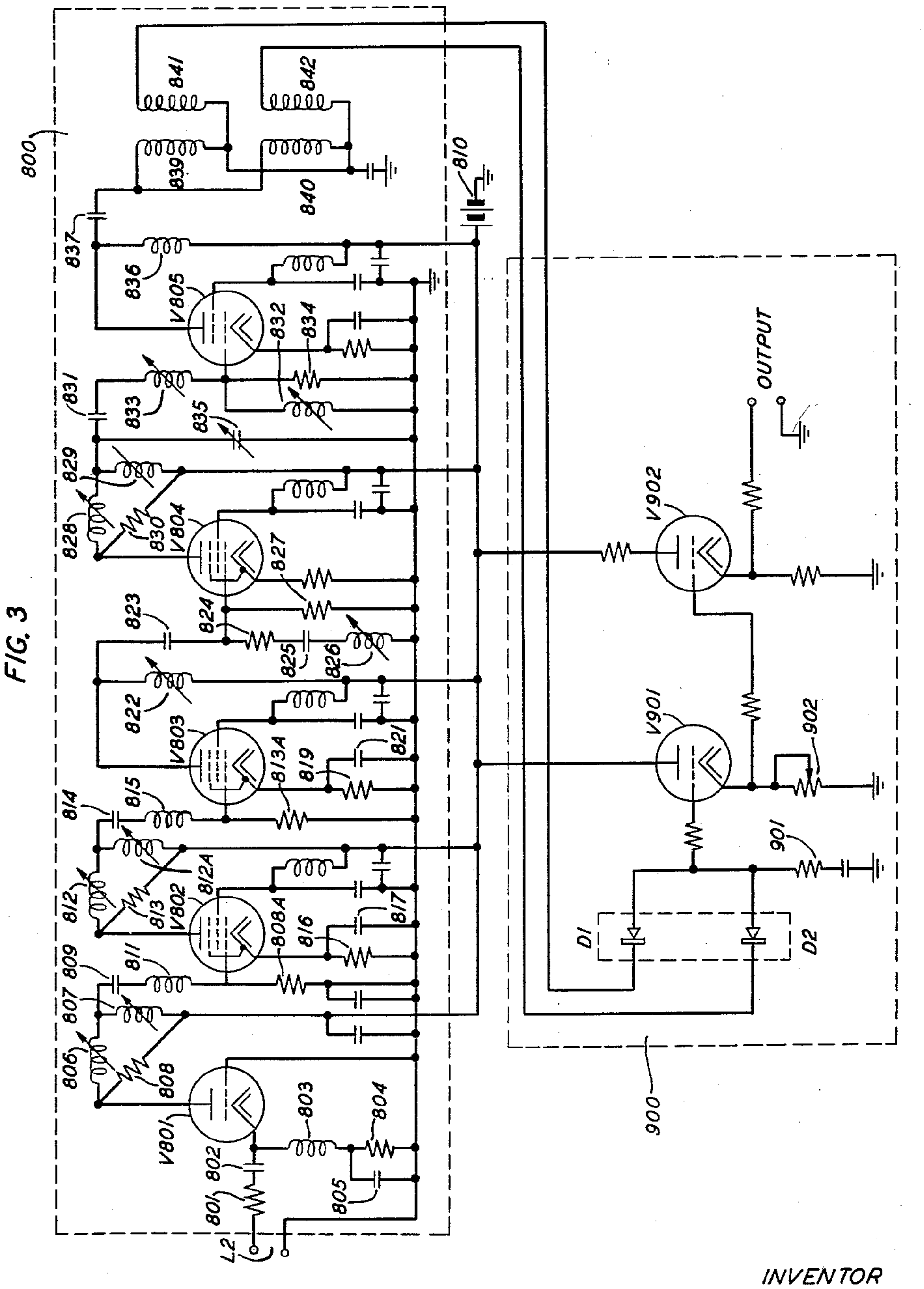

The output of the preamplifier 700 is supplied to the main carrier amplifier 800, shown diagrammatically in FIG. 3. The signal output supplied by the line L2 is applied to the cathode of the grounded grid tube V801 through the coupling arrangement comprising the resistance 801, the stray capacitance, and the capacitance 802, which serves to match the input resistance of the tube V801 to the line L2. The cathode inductance 803 neutralizes the input capacitance of tube V801, and the resistance 804 and capacitance 805 provide self-bias to the cathode. The tube V801 as well as the tubes V802, V803, V804 and V805 are each operated as conventional band-pass amplifiers. The output of the first stage V801 is coupled to the grid of the second stage V802 by an arrangement comprising the inductances 806, 807, and 811, the resistance 808 and 808A, the stray capacitances, and the capacitance 809, which simulates a double-tuned transformer. The plate voltage is supplied from the voltage supply 810. The second stage V802 is operated as a conventional pentode amplifier having a cathode self-biasing arrangement made up of the resistance 816 and capacitance 817, and deriving its plate and screen voltages from the voltage supply 810. The output of tube V802 is coupled to the grid of tube V803 by an arrangement comprising the inductances 812, 812A, and 815, the resistances 813 and 813A, the stray capacitances and the capacitance 814, which simulates a double-tuned transformer. The third stage V803 is also operated as a conventional pentode amplifier having a cathode bias circuit made up of resistance 819 and capacitance 821 and deriving its plate and screen voltages from the voltage supply 810. The output from the tube V803 is coupled to the grid of the amplifier tube V804 through the coupling condenser 823 and a "soaker" circuit comprising a series resonant circuit made up of resistance 824, capacitance 825, and inductance 826 connected across a shunt resonant circuit consisting of inductance 822, resistance 827, and the stray capacitances of the plate output and grid input circuits. This soaker circuit compensates for the single peaked band-pass characteristic of the delay element 500. It consists essentially of a low Q shunt resonant circuit in parallel with a higher Q series resonant circuit. Both circuits are tuned separately to resonate at the middle of the pass band. The Q of the shunt resonant circuit is preferably made as low as possible consistent with the desired gain. The soaker Q is then made to correspond to the effective Q of the delay element 500. The values of the resistances 824 and 827 are selected to provide the desired Q's in the series and shunt resonant circuits, respectively. In other respects, tube V804 operates as a conventional amplifying stage.

The plate of the tube V804 is coupled to the grid of the tube V805 which forms the succeeding amplifying stage through the coupling capacitance 831 and a triple-tuned network comprising the industances 828, 829, 832, and 833, resistances 830 and 834, the stray capacitances, and the capacitance 835. This network is designed as follows: Two double-tuned step-down transformers are designed to work in tandem as double-tuned matched transformers. The first steps the plate load impedance down to an intermediate impedance level. The second steps the level down further to the grid load impedance. When these two transformers are connected in tandem, each provides the correct impedance for the other, therefore requiring no dissipative element at the junction point. To minimize the number of circuit elements, the following procedure is used: The first transformer is designed to yield an equivalent T network in which one branch reduces to zero impedance with a coupling coefficient of 0.5. The second transformer is then designed as an equivalent Π network with a somewhat lower couling coefficient of about 0.4. By combining shunt inductances and capacitances, the number of essential physical elements can be reduced to the arrangement illustrated. Such a triple-tuned interstage network provides a convenient means for fine adjustment of the gain-frequency response to obtain the necessary equalization. The tube V805 is the output stage of the main amplifier and supplies its output to the detector circuit 900. The plate voltage for tube V805 is applied from the voltage supply 810 through the inductance 836 which is chosen to resonate with the stray capacitance at the mid-band frequency. To provide maximum voltage across the detector load, minimum resistance is introduced in the plate circuit of tube V805. The output is applied to the parallel primary windings 839 and 840 of the radio frequency transformer T1 through the coupling capacitance 837. The secondary windings 841 and 842 of the transformer T1 are connected in the conventional push-pull manner for operation with a balanced envelope detector, which comprises the two crystal detectors D1 and D2 and their associated load comprising the resistance 901. The output voltage appearing across the resistance 901 is supplied to the cascaded cathode followers V901 and V902 for power amplification. The output of the cathode follower V902 is a facsimile of the input applied to the video amplifier 100 (FIG. 1), which has been delayed one television line time. This output can thereafter be utilized in the manner of a standard television signal.

Figure 4:
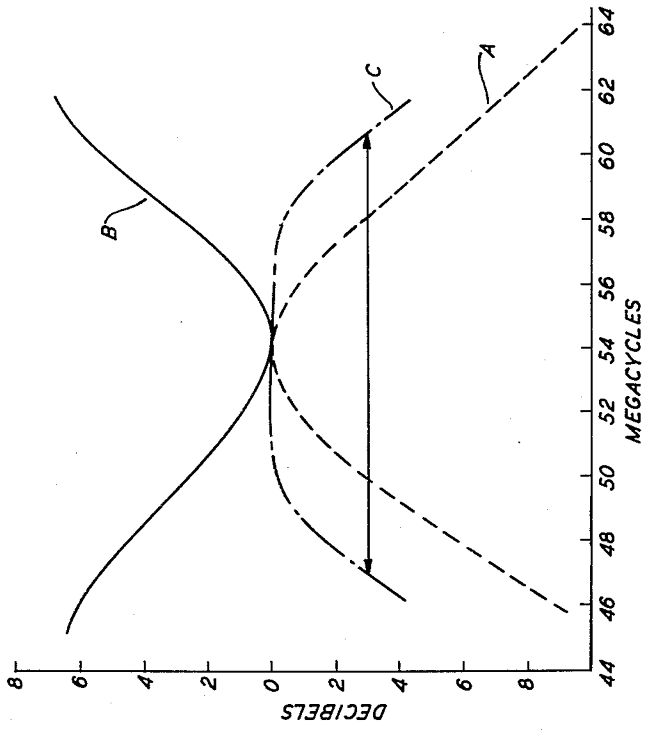
FIG. 4 shows some characteristic curves useful in explaining the invention.

In FIG. 4 there are illustrated characteristic curves for a system of this kind. Curve A shows the single peak band-pass characteristic of the delay element, and curve B shows the double peak characteristics of the main amplifier with its "soaker" circuit. The curve C shows the equalized characteristic obtained by associating the delay element with the main amplifier. It will be noted that there is achieved a characteristic which is substantially flat for a band width of seven megacycles and down only three decibels for a band width of fourteen megacycles.

It can be appreciated that the above-described arrangement is merely illustrative of the invention. Other arrangements can be devised without departing from the scope and spirit of the invention.

What is claimed is:

1. In a system for delaying a television signal substantially one line time, a source of television signals, a source of a carrier frequency wave, means for modulating the carrier frequency wave with the television signals for deriving a signal wave, a fused silica delay line of a length corresponding to a delay of substantially one line time, means for impressing the signal wave on one end of the delay line comprising an input signal transducer and a double-tuned circuit with single-side loading concentrated across the input signal transducer, means for deriving the delayed signal wave at the other end of the delay line comprising an output signal transducer and a double-tuned circuit with single-side loading concentrated across the output signal transducer, amplifying means supplied with the delayed signal wave comprising a cascode amplifier and a soaker circuit comprising a low Q shunt resonant circuit in parallel with a higher Q series resonant circuit, both said circuits being tuned separately to resonate at the middle of the signal wave band and the Q of the soaker circuit adjusted to correspond to the effective Q of the delay line, and means for detecting from the amplified delayed signal wave the delayed television signal.

2. In a system for delaying a television signal substantially one line time, a source of television signals, a source of a carrier wave, means for modulating the carrier wave with the television signals for deriving a signal wave, a fused silica delay line of a length corresponding to a delay of substantially one line time, means for impressing the signal wave on one end of the delay line comprising a double-tuned circuit with single-side loading concentrated at the input side of said delay line, means for deriving the delayed signal wave at the other end of the delay line comprising a double-tuned circuit with single-side loading concentrated at the output side of said delay line, amplifying means supplied with the delayed signal wave comprising a preamplifier section and a main amplifier section, said main amplifier section having a soaker circuit including a low Q shunt resonant circuit in parallel with a higher Q series resonant circuit, both said circuits being tuned separately to resonate at the middle of the signal wave band, the Q of the soaker circuit corresponding to the effective Q of the delay line, and means for detecting a delayed facsimile of the television signal from the amplified delayed wave.

3. In a system for delaying a television signal substantially one line time, a fused silica delay line for introducing a delay of substantially one line time, means for impressing a television wave which is to be delayed to the input end of said line comprising a double-tuned circuit with single-side loading concentrated at the input end of the line, means for deriving the delayed television wave at the output end of the line comprising a double-tuned circuit with single-side loading concentrated at the output end of the line, and an equalizing amplifier supplied with the delayed television wave.

4. A delay system for use in television systems to delay a television signal substantially one line time comprising a source of a carrier frequency wave, means for modulating the carrier frequency wave with the television signals to be delayed for deriving a signal wave, a fused silica delay line of a length corresponding to a delay of substantially one line time, means for impressing the signal wave on one end of the delay line comprising an input signal transducer and a double-tuned circuit with single-side loading concentrated across the input signal transducer, means for deriving the delayed signal wave at the other end of the delay line comprising an output signal transducer and a double-tuned circuit with a single-side loading concentrated across the output signal transducer, a first amplifying means supplied with the delayed signal wave comprising a cascode amplifier, a second amplifying means comprising a carrier amplifier and a soaker circuit, said soaker circuit comprising a low Q shunt resonant circuit in parallel with a higher Q series resonant circuit, both said circuits being tuned separately to resonate at the middle of the signal wave band and the Q of the soaker circuit adjusted to correspond to the effective Q of the delay line, and means for detecting from the amplified delayed signal wave the delayed television signal.

References Cited in the file of this patent

UNITED STATES PATENTS

| | | |
|---|---|---|
| 1,726,578 | Nyquist | Sept. 3, 1929 |
| 1,832,366 | Dudley | Nov. 17, 1931 |

(Other references on following page)

UNITED STATES PATENTS

| | | |
|---|---|---|
| 1,984,450 | Aceves | Dec. 18, 1934 |
| 2,004,253 | Tasker | June 11, 1935 |
| 2,195,095 | Rinia | Mar. 26, 1940 |
| 2,278,801 | Rust et al. | Apr. 7, 1942 |
| 2,318,417 | Phelps | May 4, 1943 |
| 2,397,850 | Ford | Apr. 2, 1946 |
| 2,501,488 | Adler | Mar. 21, 1950 |
| 2,512,130 | Arenberg | June 20, 1950 |
| 2,590,405 | Hansell | Mar. 25, 1952 |
| 2,626,992 | Holman | Jan. 27, 1953 |

OTHER REFERENCES

Publication II, "Radio Engineering," by F. E. Terman, 3rd edition, McGraw-Hill Book Company, Inc., New York, 1947, pages 71 and 358.

Publication I, "A Low-Noise Amplifier," by Wallman, Macnee and Gadsden, vol. 36, No. 6, pages 700–708 in Proceedings of I.R.E. published June 1948.